June 6, 1967  W. E. PORTMAN  3,324,024
CELL FOR MAKING ALKALI METAL CHLORATES
Filed Aug. 6, 1962  4 Sheets-Sheet 1
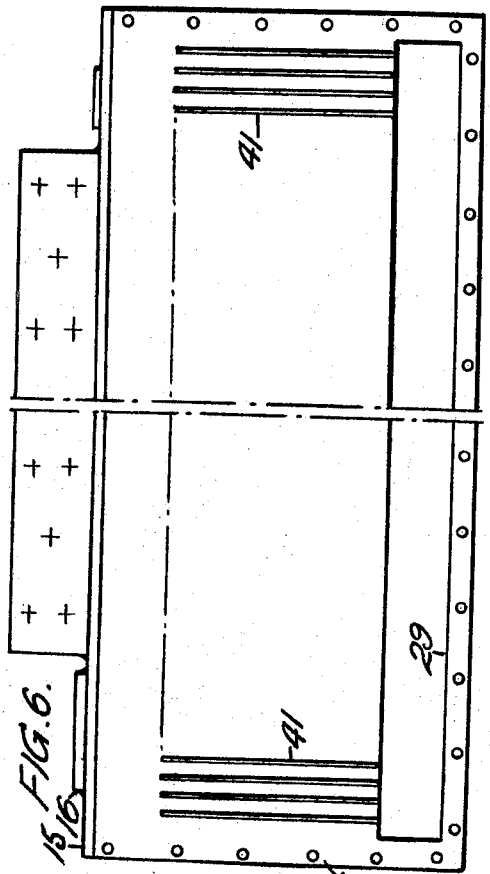
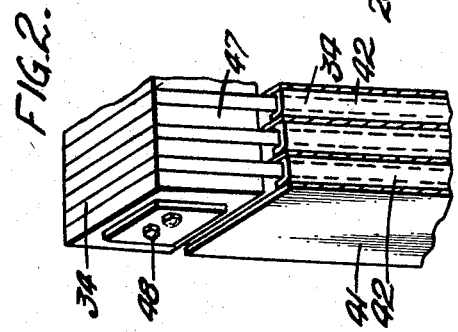
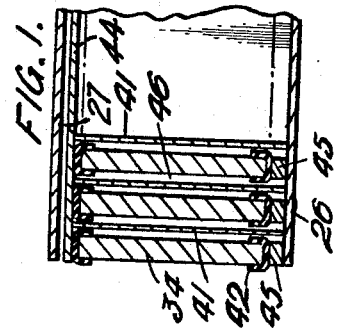
INVENTOR
William E. Portman
By Watson, Cole, Grindle & Watson
ATTORNEYS.

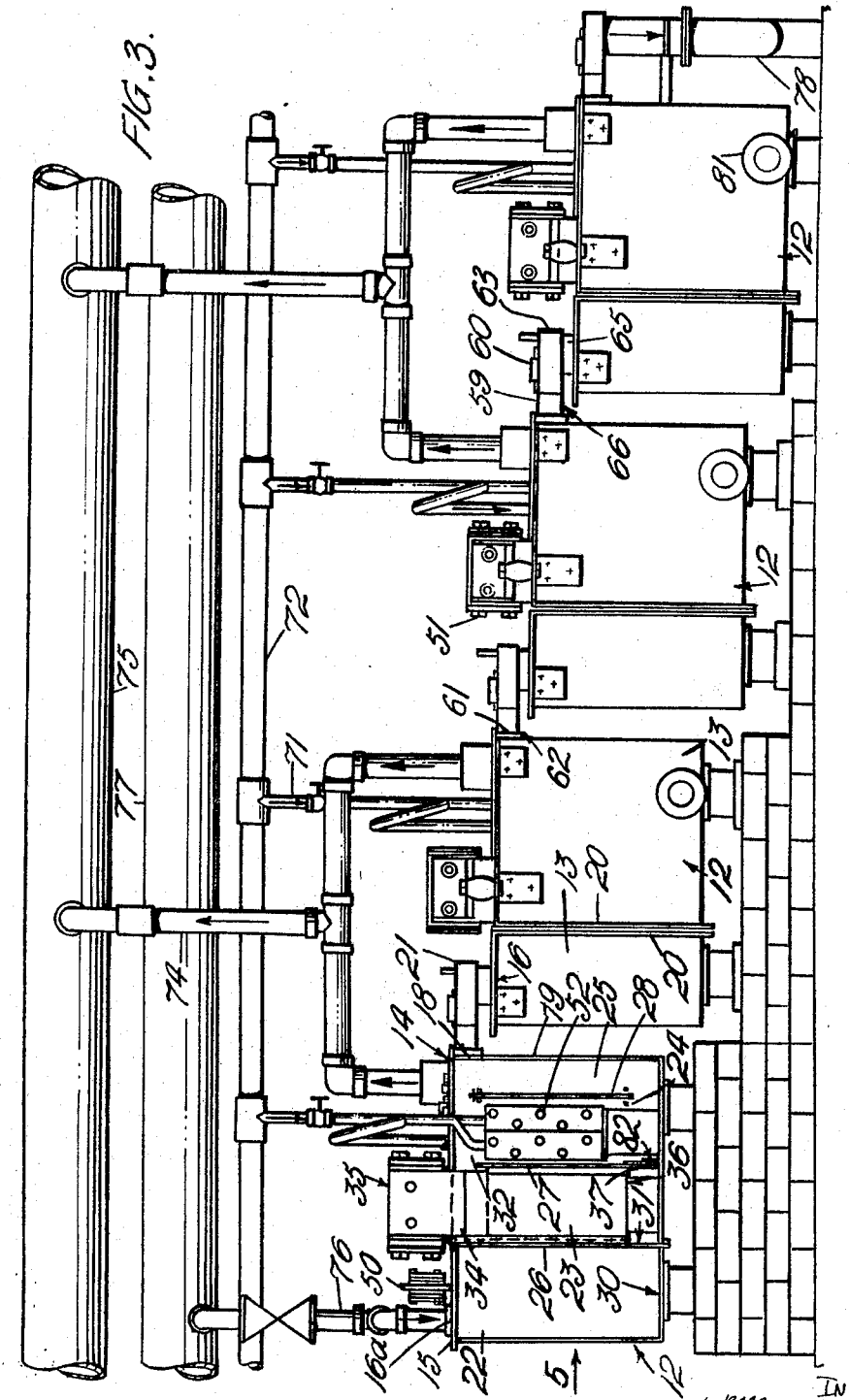

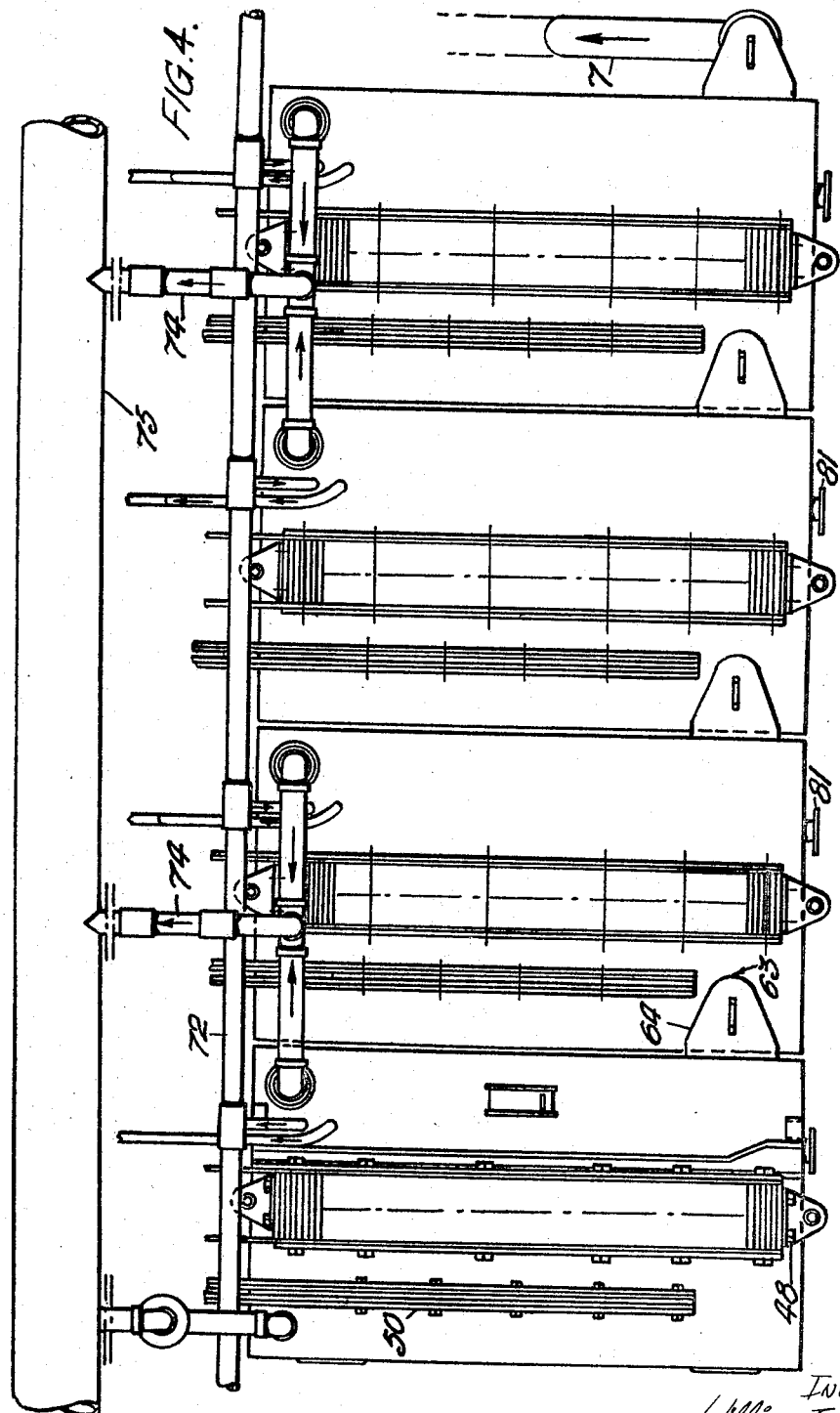

June 6, 1967   W. E. PORTMAN   3,324,024
CELL FOR MAKING ALKALI METAL CHLORATES
Filed Aug. 6, 1962   4 Sheets-Sheet 4

INVENTOR
William E. Portman
By Watson, Cole, Grindle & Watson
ATTORNEYS

United States Patent Office 3,324,024
Patented June 6, 1967

3,324,024
CELL FOR MAKING ALKALI METAL CHLORATES
William Ewart Portman, Hollingwood England, assignor to The Staveley Iron & Chemical Company, Chesterfield, England, a British company
Filed Aug. 6, 1962, Ser. No. 215,031
Claims priority, application Great Britain, Aug. 10, 1961, 28,975/61
7 Claims. (Cl. 204—269)

This invention relates to cells for making alkali-metal chlorates and particularly sodium chlorate.

According to the invention there is provided a cell for making alkali-metal chlorates comprising a compartment having side walls, an electrolyte inlet at its lower end and an electrolyte outlet at its upper end; a stack of alternately interleaved anode and cathode plates within and extending across the compartment between the electrolyte inlet and outlet; means to connect said electrode plates to appropriate electrical connections; and insulating means at the side walls interposed between the edges of the plates and between the edges of alternate plates and the side walls to maintain the said alternate plates physically and electrically spaced from the other plates and the side walls. The side walls may be connected to the cathode plates.

The anode plates, which preferably constitute the said alternate plates, are preferably suspended from above the compartment and are connected at their upper ends to one or more bus-bars for supply of electrical energy thereto. The upper ends of the anode plates are preferably connected together to form an anode block by means e.g. of tie-bars with distance pieces interposed between adjacent anode plates.

Preferably the distance between the side walls is less than the length of the plates between the inlet and outlet so that the effective length of the plates is greater than, and preferably between two and two-and-a-half times their effective width.

Preferably the sum of the cross-sectional areas of the plates constitutes a large proportion of the cross-sectional area of the compartment, which proportion may be between 60 and 80%, to induce high speed electrolyte flow past the plates.

Preferably the cell comprises a plurality of compartments. Preferably one of the compartments discharges from its lower end into the said compartment containing the plates. Preferably a compartment which receives electrolyte from the said plate containing compartment contains cooling means, e.g. cooling coils, for cooling the electrolyte.

According to another aspect of the invention there is provided a cell unit comprising a plurality of cells as described above arranged in cascade with the outlet of one cell connected to the inlet of a subsequent cell.

One embodiment of the invention will now be described by way of example with reference to the accompanying drawings. In the drawings:

FIGURE 1 is a section through a compartment of a cell of the invention;

FIGURE 2 is a perspective view of the anode block;

FIGURE 3 is a side view partly in section of a cell unit of the invention, the section being taken on line 3—3 of FIGURE 4;

FIGURE 4 is a plan of the unit;

FIGURE 6 is a front view of the first baffle plate of each cell.

Figure 5:
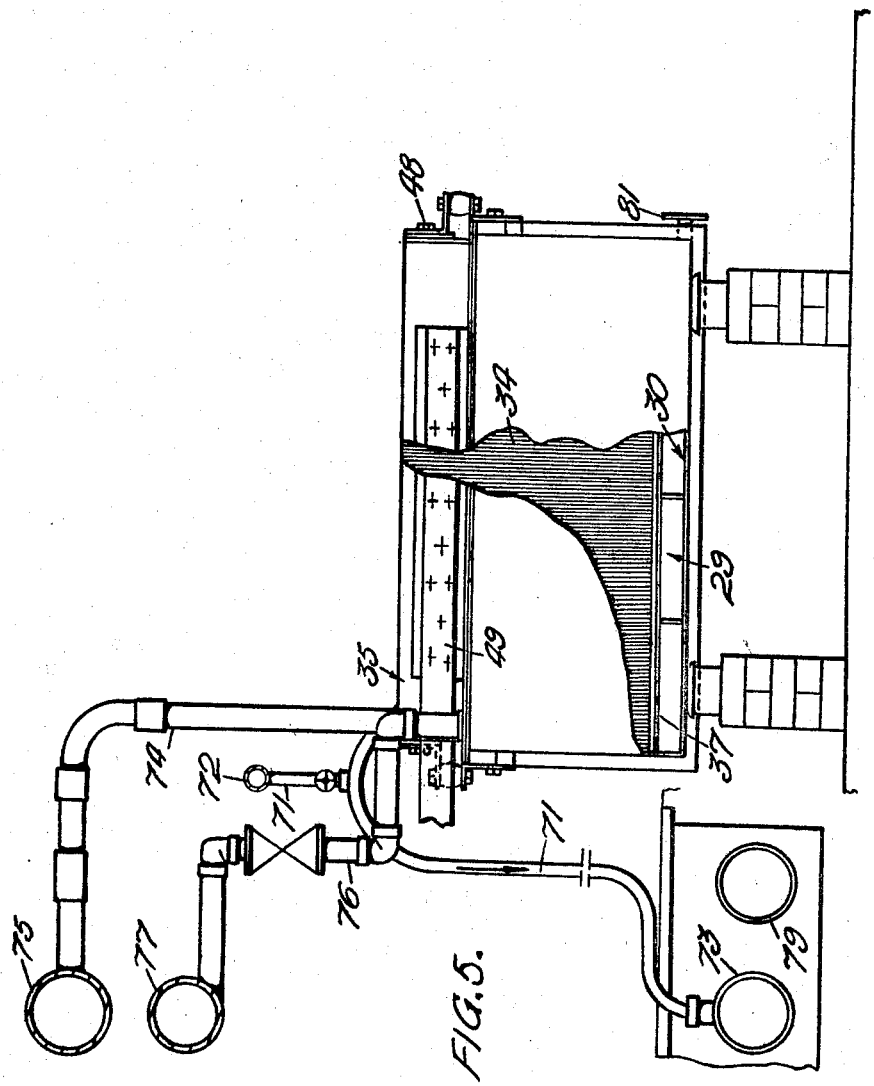
FIGURE 5 is an end view of the unit in the direction of arrow 5 in FIGURE 3.

Referring now to the drawings as shown in FIGURES 3 and 4, the unit comprises four cells 12 arranged in cascade. Each cell 12 is cuboidal and made of steel. The cell 12 is made in two parts 13 and has a multi-part polyvinyl chloride cover 14 through one end part 15 of which there is an inlet 16 for electrolyte (brine). At the other end of the cell 12 there is an electrolyte outlet 18 in the upper end of a side wall 19 which outlet is connected to an overflow device 21 (hereinafter to be described in more detail) which leads to the inlet 16 of the next successive cell 12. Each cell 12 is divided into four compartments 22, 23, 24 and 25 by three baffles 26, 27 and 28 constituting side walls for the compartments. The first compartment 22, which is covered by the aforesaid end part 15 of the cover 14 and into which the inlet 16 discharges, is wider than the next two compartments 23 and 24 being of approximately the same width whilst the last compartment 25 is the narrowest. The first baffle 26 defining the side of the first compartment 22 comprises a plate which is bolted between flanges 20 on cell parts 13. The plate 26 is welded to the said end part 15 of the cover 14 and is provided with a rectangular opening 29 (FIGS. 5 and 6) therethrough, which opening extends across the whole width of the cell and upwardly from the base 30 for a few inches (say 4½"). The second baffle 27 extends from the base 30 to a few inches below the top of the cell 12 but above (say 2½" above) the top edge of the cathode plates 41 hereinafter described. The third baffle has its lower edge 2–3" from the base 30 whilst its top edge is above the lower edge of the outlet 18. Thus the inlet 31 to the second compartment 23 is at its lower end whilst its outlet 32 is at its upper end. The first compartments 22 of the second, third and fourth cells 12 each have an overflow baffle plate 33 which slopes downwardly from a high position below the inlet 16 to provide an improved flow pattern of electrolyte in that compartment.

The second compartment 23 contains fifty-four rectangular graphite electrode plates 34 which extend from an anode block 35 carried by but insulated from the cover 14. The lower ends 36 of the graphite plates 34 are supported by the insulated upper faces of two angle iron bars 37 respectively carried by the side walls 26 and 27 of the compartment 23 and located slightly above the lower edge of the first baffle 26. Interleaved between the graphite plates 34 are rectangular steel electrode plates 41 welded to the first baffle 26 which also serves as the cathode plate. Channel section insulators 42 (see FIGURE 1) receive the longitudinal edges of the graphite plates 34 to space these both physically and electrically from the adjacent steel plates 41. The side 43 of the second baffle 27 defining the second compartment 23 is faced with an insulator 44 and insulating blocks 45 are provided between the base of the insulating channel 42 and the first baffle 26.

The effective length (i.e., in the direction of the depth of the compartment) of the plates 34 and 41 is greater than the effective width (i.e., in the horizontal direction). It is at least twice, preferably between two and two-and-a-half times, and in this example is two and a third times as great. The sum of the cross-sectional areas of the plates 34 and 41 is approximately 60–80% of the sectional area of the chamber 23. Thus only about 20–40% of the sectional area of the chamber 23 constitutes the electrolyte flow area. This is constituted by one hundred and ten flow passages 46 of substantially the same cross-section. One hundred and eight of the passages are formed between adjacent electrode plates 34 and 41 and two are between the end plates of the stack and the end walls of the compartment.

The anode block 35 is made up of the upper ends of the graphite plates 34 and spacer members 47 of the same material, the whole being held together by tie-bars 48 extending through the block. The side edges of the anode block 35 have machined faces. A bus bar 49 connected to the positive pole of a power source (not shown) runs alongside and is connected by pressure from bolts 51 to the edges of the anode block. The cells are electrically connected in series and the total operating voltage is applied across the entire unit. The cover part 15 of the first compartment of the cell and the first baffle 26 are cathodically connected by bus bar 50. Thus the graphite plates 34 act as anodes and the steel plates 41 as cathodes.

A cooling coil 52 is set in the third compartment 24 so that electrolyte discharged from the second compartment 23 is cooled before being passed into the fourth compartment 25 from which it is discharged. The cooling coil 52 is cathodically connected.

The outlet 18 from each cell 11 is rectangular in section. The overflow device 21 is made of polyvinyl chloride. It has a removable lid 59 with a handle 60 and an inlet 61 of corresponding section to the outlet 18 around which inlet are flanges 62 by means of which the device 21 is bolted to the cell. The device 21 is generally triangular in plan with a rounded end 63 and a rectangular inlet channel. A pipe 65 leads from the underside 66 of the device 21 to the inlet 16 of the subsequent cell.

In each cell of the unit there are the following pipe connections: Pipes 71 connecting the cooling coils 52 to the water mains 72 and drain 73 and gas removal pipes 74 from the top of the fourth compartment 25 to the gas mains 75. A brine inlet pipe 76 leads from the brine mains 77 to the inlet 16a of the first cell of the unit. The outlet 18 of the last cell of the unit is connected by a pipe 78 to a brine return main 79 for recirculation. Each cell 12 is provided with a tapping outlet 81 between the third and fourth compartments 24 and 25 from which outlet the sodium chlorate solution may be run off. A valve 82 is provided in the second baffle plate 27 at the cell base 30 so that electrolyte in the first and second compartments can flow to the tapping outlet 81.

We have found that as the flow area through the second compartment is decreased the electrolyte flow is normally sufficiently fast to move any dirt from between the plates. Thus the possibility of the electrodes being short circuited by pieces of dirt or graphite is substantially reduced. The speedy flow of electrolyte will also continually be moving the hydrogen bubbles formed on the faces of the cathodes and will so minimise the possibility of an electrically resistant film being formed on the cathode which will reduce its power efficiency. Thus the electrical potential required to drive the current through the electrolyte will remain at a minimum.

Furthermore as the plates extend across substantially the whole area of the second chamber all of the electrolyte will pass through the electrolyte passages. This too increases the efficiency of the cell.

Although the unit described comprises four cells it may comprise a different number of cells, e.g., six.

I claim:
1. A cell for making alkali metal chlorates comprising side walls and first and second vertical baffles dividing the cell into three compartments, the first compartment having at its top an electrolyte inlet and baffle means disposed below said inlet to provide an even distribution of electrolyte across a horizontally elongated electrolyte inlet extending below the first baffle adjacent the bottom of the second compartment, said second compartment containing a stack of vertically disposed alternately interleaved anode plates and cathode plates, said anode plates being suspended from the top of the cell and said cathode plates being attached to the first baffle, said anode and cathode plates extending across substantially the entire horizontal cross-section of the second compartment and having cross-sectional areas which together constitute from 60% to 80% of the entire cross-sectional area of the second compartment, and insulating means interposed between the edges of alternate anode and cathode plates and the side walls of the cell to maintain said alternate plates physically spaced and electrically insulated from the other plates and the side walls, and a horizontally elongated electrolyte outlet extending over the second baffle from the top of the second compartment into the third compartment for storing electrolyte until effervescence has diminished, said third compartment having an outlet for removal of the electrolyte.

2. A cell as claimed in claim 1 wherein the anode plates are connected at their upper ends to at least one bus-bar for supply of electrical energy thereto.

3. A cell as claimed in claim 2 wherein the upper ends of the anode plates are connected together to form an anode block by means of tie-bars with distance pieces interposed between adjacent anode plates.

4. A cell as claimed in claim 1 wherein the distance between the side walls is less than the length of the plates between the inlet and outlet so that the effective length of the plates is greater than their effective width.

5. A cell as claimed in claim 4 wherein the effective length of the plates is between two and two-and-a-half times their effective width.

6. A cell as claimed in claim 1 wherein said third compartment which receives electrolyte from the said plate containing compartment contains means for cooling the electrolyte.

7. A cell unit comprising a plurality of cells as claimed in claim 1 arranged in cascade with the outlet of one cell connected to the inlet of a subsequent cell.

References Cited
UNITED STATES PATENTS

| | | | |
|---|---|---|---|
| 728,440 | 5/1903 | Boucher | 204—269 |
| 2,196,355 | 4/1940 | Cremer | 204—269 X |
| 3,207,686 | 9/1965 | Jarvis et al. | 204—302 |
| 3,219,563 | 11/1965 | Collins et al. | 204—95 |

FOREIGN PATENTS

| | | |
|---|---|---|
| 18,356 | 1904 | Great Britain. |
| 845,043 | 8/1960 | Great Britain. |

JOHN H. MACK, *Primary Examiner.*

R. K. MIHALEK, *Assistant Examiner.*